US009652502B2

(12) United States Patent
Majeed et al.

(10) Patent No.: US 9,652,502 B2
(45) Date of Patent: May 16, 2017

(54) METHOD AND SYSTEM FOR CONTINUOUS QUERY PROCESSING

(75) Inventors: Basim Majeed, Abu Dhabi (AE); Ali Afzal, London (GB); Marcello Leida, Abu Dhabi (AE); Maurizio Colombo, Abu Dhabi (AE)

(73) Assignees: Khalifa University of Science, Technology and Research, Abu Dhabi (AE); British Telecommunications plc, London (GB); Emirates Telecommunications Corporation, Abu Dhabi (AE)

( * ) Notice: Subject to any disclaimer, the term of this patent is extended or adjusted under 35 U.S.C. 154(b) by 1187 days.

(21) Appl. No.: 13/435,756

(22) Filed: Mar. 30, 2012

(65) Prior Publication Data

US 2013/0262502 A1  Oct. 3, 2013

(51) Int. Cl.
*G06F 17/30* (2006.01)

(52) U.S. Cl.
CPC .... *G06F 17/3051* (2013.01); *G06F 17/30516* (2013.01); *G06F 17/30908* (2013.01)

(58) Field of Classification Search
CPC ............ G06F 17/2785; G06F 11/1012; G06F 11/1048; G06F 17/10; G06F 17/509
USPC ................................. 707/769, 722
See application file for complete search history.

(56) References Cited

U.S. PATENT DOCUMENTS

| | | | |
|---|---|---|---|
| 5,680,602 A | 10/1997 | Bloem et al. | |
| 6,345,267 B1 * | 2/2002 | Lohman et al. | |
| 7,650,331 B1 | 1/2010 | Dean et al. | |
| 7,818,313 B1 * | 10/2010 | Tsimelzon | G06F 17/30545 707/718 |
| 8,176,022 B1 * | 5/2012 | Garcia | 707/704 |
| 2004/0236722 A1 * | 11/2004 | Waas et al. | 707/2 |
| 2006/0218123 A1 * | 9/2006 | Chowdhuri et al. | 707/2 |
| 2007/0162425 A1 * | 7/2007 | Betawadkar-Norwood et al. | 707/2 |

(Continued)

OTHER PUBLICATIONS

Prud'hommeaux et al., SPARQL Query Language for RDF W3C Recommendation Jan. 15, 2008, http://www.w3.org/TR/rdf-sparql-query.

(Continued)

*Primary Examiner* — Truong Vo
(74) *Attorney, Agent, or Firm* — Calfee Halter & Griswold, LLP (57) ABSTRACT

The invention relates to a method and system that provide a continuous querying mechanism that analyses real-time data streams to generate relevant results. It leverages data grid and event processing technology to provide a high performance and extremely scalable continuous querying solution. An embodiment of the invention provides a flexible querying language and data storage to allow users to register their interest in specific types of data, e.g. processes. The users are notified of matching results using an event-based mechanism. In order to efficiently analyze a large amount of data, the embodiment uses a grid infrastructure that allows storage of the data across many grid nodes and distributes the query execution workload, avoiding the bottleneck represented by constantly querying a database. Continuous queries are stored in a Continuous Query Registry and that Registry is invoked every time an insert or update event occurs on the triple store.

19 Claims, 1 Drawing Sheet

(56) References Cited

U.S. PATENT DOCUMENTS

| | | | |
|---|---|---|---|
| 2009/0138437 A1* | 5/2009 | Krishnamoorthy et al. | 707/3 |
| 2009/0228465 A1* | 9/2009 | Krishnamurthy et al. | 707/4 |
| 2009/0248631 A1* | 10/2009 | Alba et al. | 707/3 |
| 2009/0327242 A1* | 12/2009 | Brown et al. | 707/3 |
| 2010/0017380 A1* | 1/2010 | Naibo et al. | 707/4 |
| 2010/0036862 A1* | 2/2010 | Das et al. | 707/101 |
| 2010/0138405 A1* | 6/2010 | Mihaila et al. | 707/713 |
| 2010/0281053 A1* | 11/2010 | Braines | G06F 17/30545 707/770 |
| 2011/0173177 A1* | 7/2011 | Junqueira | G06F 17/30864 707/709 |
| 2012/0089595 A1* | 4/2012 | Jaecksch | 707/714 |
| 2012/0117065 A1* | 5/2012 | Nehme et al. | 707/737 |
| 2012/0166440 A1* | 6/2012 | Shmueli et al. | 707/737 |
| 2013/0117305 A1* | 5/2013 | Varakin et al. | 707/769 |

OTHER PUBLICATIONS

Cyganiak et al., RDF 1.1 Concepts and Abstract Syntax, W3C Recommendation Feb. 25, 2014, http://www.w3.org/TR/2014/REC-rdf11-concepts-20140225/.

Sesame 2.x official User Guide for Sesame: http://openrdf.callimachus.net/sesame/2.7/docs/users.docbook?view#Introduction, accessed Jul. 16, 2014.

Jena—A Semantic Web Framework for Java http://jena.apache.org/documentation/rdf/, accessed Jul. 16, 2014.

Oracle Database Semantic Technologies http://docs.oracle.com/cd/E11882_01/appdev.112/e11828/sdo_rdf_concepts.htm#CIHECGII (section 1.1, 1.2, 1.3), Copyright 2005, accessed Jul. 16, 2014.

BigOWLIM—OWL Semantic Repository http://owlim.ontotext.com/display/OWLIMv54/OWLIM-SE+Usage+Scenarios, last edited Aug. 30, 2012.

AllegroGraph RDFStore Web 3.0's Database: http://franz.com/agraph/support/documentation/current/agraph-introduction.html#ai-overview, last updated Jun. 4, 2014.

Harris et al., SPAQRL 1.1 Query Language, W3C Recommendation Mar. 21, 2013, http://www.w3.org/TR/sparql11-query/.

Tsc User Guide, v1.3, Aug. 13, 2009, http://tsc.sti2.at/.

Kaoudi, Z.; Kyzirakos, K. & Koubarakis, M. (2010), SPARQL Query Optimization on Top of DHTs., in Peter F. Patel-Schneider; Yue Pan; Pascal Hitzler; Peter Mika; Lei Zhang 0007; Jeff Z. Pan; Ian Horrocks & Birte Glimm, ed., 'International Semantic Web Conference (1)', Springer, pp. 418-435, http://www.academia.edu/383983/SPARQL_Query_Optimization_on_Top_of_DHTs.

Fensel, D.; van Harmelen, F. & Andersson, B. (2008), Towards LarKC: A Platform for Web-Scale Reasoning, in 'ICSC', IEEE Computer Society, pp. 524-529, http://www.larkc.eu/wp-content/uploads/2008/05/larkc-icsc08.pdf.

Zeyliger—How Raytheon BBN Technologies Researchers Are Using Haddop to Build a Scalable, Distributed Triple Store, Mar. 22, 2010, SHARD http://www.cloudera.com/blog/2010/03/how-raytheon-researchers-are-using-hadoop-to-build-a-scalable-distributed-triple-store/.

Davide Francesco Barbieri, Daniele Braga, Stefano Ceri, Emanuele Della Valle, and Michael Grossniklaus. C-SPARQL: SPARQL for continuous querying. In Proceedings of the 18th international conference on World wide web (WWW '09)., Apr. 20-24, 2009, ACM, New York, NY, USA, 1061-1062. DOI=10.1145/1526709.1526856.

Liarou, E.; Idreos, S. & Koubarakis, M., Continuous RDF Query Processing over DHTs, ISWC/ASWC, vol. 4825 of Lecture Notes in Computer Science, p. 324-339. Springer, (2007).

Darko Anicic, Paul Fodor, Sebastian Rudolph, and Nenad Stojanovic. EP-SPARQL: a unified language for event processing and stream reasoning. In Proceedings of the 20th international conference on World wide web (WWW '11), Mar. 28-Apr. 1, 2011. ACM, New York, NY, USA.

International Search Report for International Patent Application Serial No. PCT/GB2012/053078 dated Sep. 23, 2013.

Written Opinion for International Patent Application Serial No. PCT/GB2012/053078 dated Sep. 23, 2013.

Alexandre Passant et al: "sparqlPuSH: Proactive Notification of Data Updates in RDF Stores Using PubSubHubbub", SFSW 2010, Jan. 1, 2010.

Cesare Pautasso et al: "Push-Enabling RESTful Business Processes", Jan. 1, 2011, Service-Oriented Computing, Springer Berlin Heidelberg, Berlin, Heidelberg, pp. 32-46.

Pablo N. Mendes et al: "Twarql", Proceedings of the 6th International Conference on Semantic Systems, I-SEMANTICS '10, Jan. 1, 2010.

\* cited by examiner

METHOD AND SYSTEM FOR CONTINUOUS QUERY PROCESSING

CROSS-REFERENCE TO RELATED CASES

This application is related to U.S. patent application Ser. No. 13/435,747, also filed on Mar. 30, 2012, and entitled "METHOD AND SYSTEM FOR PROCESSING DATA QUERIES", the entire disclosure of which is hereby incorporated herein by reference in its entirety.

FIELD OF THE INVENTION

The present invention relates to a method and system for processing data queries. It is particularly, but not exclusively, concerned with methods and systems for continuously processing data queries and returning the results of those queries when relevant data modified in or added to a data set.

BACKGROUND OF THE INVENTION

Real-time Business Process Mining (BPM) is an increasingly critical area of information technology, helping businesses to leverage their resources for maximum benefit. It is an important part of Business Process Management that allows companies to analyze their processes based on actual real-time data collected from their systems. The goal is to enable companies to understand their processes and the state of their business and adapt quickly to changing business conditions. BPM improves the speed of process analysis by automatically generating real-time process models from events and messages generated by the underlying systems. By linking information from these sources it allows instant analysis of the business processes generating interactive visual displays of how the process works and shows how specific case characteristics influence processing times.

Process Mining can dramatically accelerate a business' discovery process. A mined process model gives users a unique insight, showing the actual underlying process model and a fascinating insight into how work is actually flowing through the business. Existing BPM systems however fall short of their promise. They tend to be restricted in the kind of data they can analyse and can sometimes put restrictions on the data model itself. Furthermore, the kind of analysis that can be performed is normally restricted to an inextensible and inflexible set of functions because these are closely tied to the data model being used.

Current technology typically requires the translation or import of data into the system before it can be analysed. This imposes severe constraints on the way the data is defined and collected and precludes any real-time analysis of the data. Limitations are also imposed by predefined database schemas that are neither flexible, nor easily extensible which puts further limits of the kind of analysis that can be performed. Moreover, such systems usually suffer from scalability issues, not least because the database itself becomes the bottleneck when a large number of requests are executed against it. The use of databases also makes real-time updates of data very difficult.

Many enterprises have business models that are highly dependent on processes that are executed both in good time (meeting Cycle Time measures) and correctly with minimal failures and repeats (meeting Right First Time measures). In such large organisations, in order to support the business in managing and improving processes across different systems and divisions, solutions are required that can analyse different forms of business process data in order to determine the real state of execution of the processes and evaluate accurately the performance measures associated with them. As automation is becoming an increasingly ubiquitous feature of process execution, there is a growing need for capabilities of monitoring and analysis that can, firstly, cope with the large amount of data generated during the process life spans and, secondly, is able to provide alarms very rapidly when risks of failures are detected.

Continuous Querying

Continuous Querying is an extremely important issue in the field of real-time data processing. Apart from solutions related to traditional databases such as Oracle Continuous query capabilities, NiagaraCQ and OpenCQ, there is very little work in the field of triple stores. In the case of a triple store defined on top of a traditional data base engine it could be possible to exploit the continuous query capabilities offered by these solutions to perform continuous queries. But this approach requires mapping queries to the triple store into SQL queries, introducing an additional layer of computation. In our preliminary study of the systems we have identified traditional databases as a big bottleneck for efficient handling of Resource Description Framework (RDF) graphs making such solutions infeasible.

Triple store systems with continuous query capabilities are limited at the moment to Atlas and LarKC.

The two approaches are very different: LarKC uses C-SPARQL [2]: an extension of the SPARQL grammar designed specially for stream processing capabilities. This extension allows defining temporal intervals of execution of the query where the results are pulled at the end of each interval by the query engine.

An example of C-SPARQL is:

```
REGISTER STREAM AllCarsTurningFromPalmIntoOak
COMPUTED EVERY 1m AS
SELECT ?car1
FROM STREAM <http://streams.org/citycameras.trdf>
[RANGE 5m STEP 1m]
WHERE { ?camera1 c:monitors c:Oak-Avenue .
?camera2 c:monitors c:Palm-Street.
?camera1 c: placedAt ?tr_light .
?camera2 c: placedAt ?tr_light .
?camera1 t: registers ?car1 .
?camera2 t: registers ?car2 .
FILTER ( timestamp(?car1)>timestamp(?car2) && ?car1 = ?car2 )}
```

The query above defines a stream updated every minute on a temporal window of 5 minutes. This is, strictly speaking, not real-time processing.

Atlas uses a different approach [3]. Queries are registered as continuous queries and the insertion of a new triple triggers the execution of these queries. This event-driven approach is more efficient in case of real-time performance requirements and optimization of the query executions.

Atlas defines two different algorithms: CQC and CSBV. The two algorithms define a continuous query as a chain of dependent sub-queries allocated to the nodes of the network. The algorithms heavily rely on the indexing mechanism: for each triple that is inserted in Atlas this is stored in multiple nodes (three nodes in CQC and seven nodes in CSBV). The selection of the nodes is defined by the hash function of the predicate, subject and object components of the triple, plus the combinations between them (in case of CSBV). This is not an optimal approach, especially in BPM applications where, for example, we have a large number of rdf:type predicates. In Atlas, a high frequency of certain predicates will result in overloading certain nodes while the resources of some other nodes may be under allocated.

Another existing approach is the EP-SPARQL query language for Event Processing [4] developed as part of the ETALIS open source Even Processing platform.

This work is an extension of the SPARQL language in a similar way to C-SPARQL, in order to perform complex event processing.

The system is able to translate an ontological knowledge base into a logic program (using Prolog). This initial knowledge base is continuously extended with an incoming flow of information, translated as well into Prolog.

EP-SPARQL allows the submitting of queries that are then translated into Backward Chaining rules that are fired when new events are inserted in the knowledge base.

The most significant difference compared with C-SPARQL is that EP-SPARQL follows a push approach to the notification of new results.

Continuous Querying Related Work

Although the authors of LarKC (with the C-SPARQL definition) claim to support continuous queries, the implementation of the C-SPARQL engine in LarKC follows a different approach to the problem and is instead, a solution oriented towards stream processing and analysis. The main reasons that prevent the use of an approach like the C-SPARQL query engine of LarKC in providing a continuous query evaluation, particularly for BPM, are:

1. There is a conceptual difference between continuous query evaluation and C-SPARQL. C-SPARQL defines a query that is executed continuously every a certain amount of time defined in the query. This means that it adopts a pull approach in order to obtain new data.

Imagine a query is submitted to be continuously executed every hour: in case new data matching the query is submitted to the system after one hour and a half of the query being registered, this result will not be returned for the next half hour, until the query is executed again.

2. C-SPARQL is also designed for processing data streams; therefore the syntax allows defining queries that are interested in a specific temporal window or slice (e.g. last 30 minutes). As an example we can submit a query that every hour controls the amount of cars that have passed through a toll gate during the last 10 minutes. So imagine at time x the query is executed and returns that from time x−10 minutes to time x a number of cars y has passed thought the gate; at time x'=x+1 hour the same query is executed and returns that y' cars have passed thought the gate from time x'-10 min to x' and so on.

3. The system can also execute queries on the entire store, but that is akin to running the query after every time interval t, where all relevant results, old or new, are returned every time. This approach is not very scalable and is fundamentally different to our data-driven approach where every continuous query invocation returns only the newest results.

Therefore the features of C-SPARQL are not practical for the present implementation. The main reason is the pull approach of LarKC for the continuous queries. This is a big limitation in case of real-time updates, because the client will receive results only after the query is executed again. This could be solved by defining very frequent query execution, but this approach will clearly lead to performance issues, for example, in case of infrequent updates to the data.

EP-SPARQL is an approach very similar to C-SPARQL: the two languages define extensions of SPARQL to be used in case of processing streams of information.

The ETALIS system, used to process EP-SPARQL queries, as we already pointed out, follows an approach that better fits the requirements of processing streams of information. Instead of a pull approach, the ETALIS system follows an approach by which new results are eventually generated when new information is entered in the system (push).

However, EP-SPARQL is not a solution used for continuously answering SPARQL queries once new information is entered in the system. Instead, it is a solution oriented towards complex event processing.

Also, the ETALIS system is based on a Prolog translation of the ontological knowledge base, meaning that the resulting system does not allow distributed processing so it is not scalable.

Furthermore, in order for the system to process events, the triples need to be accentuated with timestamps.

The Atlas system has been briefly described above. This is a system based on Distributed Hash Tables (DHT) over a peer-to-peer or overlay network and it has several problems such as:

1. Scalability: the Atlas system is not scalable. The tests provided with the documentation report that the system has problems to store more than a million triples, This aspect also introduces performance issues because each query goes across several nodes before finding a result. Moreover data is replicated: for each triple that is inserted in Atlas this is stored in multiple nodes.

2. No failover mechanism: due to peer to peer nature of the approach the triples are replicated in some nodes. But in case of nodes failure or network problems, the triples are not restored. This compromises also the execution of the continuous query.

3. Old triples need to be "remembered" for matching later on in the query.

4. The queries in Atlas are defined using RDQL, a query language that has limited expressiveness.

It is therefore an aim of the present invention to solve the problems intrinsic of Atlas technology and also to improve the performance and expressiveness of the query language.

From the above, it can be seen that current SPARQL execution engines provide limited support for sophisticated continuous querying. It is therefore an object of the present invention to provide methods and systems which are able to execute normal SPARQL queries over real-time data with no modifications.

It is a further aim of the present invention to provide methods and systems which are inherently scalable, for example by distributing processing across all available grid nodes.

It is a further aim of the present invention to provide methods and systems which have a simple interface for subscribing to notifications in order to make integration with other systems easy.

A further object of the present invention is to allow the analysis and monitoring of process execution in real-time by processing event streams.

SUMMARY OF THE INVENTION

An exemplary method of the present invention provides a method of processing a continuous query on a stored data set, the method including the steps of: receiving a query designated as a continuous query and storing a query model representing that query containing one or more atoms which are individual queries on the data set; when new data is added to the data set, or the data set is modified, checking the new or modified data against the atoms of the stored query model to determine if any part of the new or modified data matches an atom of the stored query model; if a match is found, checking whether the new or modified data matches the stored query model as a whole; if a match is found with the model as a whole, assigning any fixed values in the new or modified data that correspond to free variables in the query model to those free variables; processing the query resulting from said assignment on the stored data set; and returning the result of the query.

A further exemplary aspect of the present invention provides a system for processing queries on a data set, the system including: one or more nodes storing part of the data in the data set and capable of executing queries on the data of the data set; a query engine which stores a query model representing a continuous query and containing one or more atoms which are individual queries on the data set, wherein, when new data is added to the data set, or the data set is modified: the node to which the data is added, or on which the data is modified sends the new or modified data to the query engine; the query engine: checks the new or modified data against the atoms of the stored query model to determine if any part of the new or modified data matches an atom of the stored query model; if a match is found, checks whether the new or modified data matches the stored query model as a whole; if a match is found with the model as a whole, assigns any fixed values in the new or modified data that correspond to free variables in the query model to those free variables; processes the query resulting from said assignment on the stored data set; and returns the result of the query.

BRIEF DESCRIPTION OF THE DRAWINGS

Embodiments of the invention will now be described by way of example with reference to the accompanying drawings in which.

DETAILED DESCRIPTION

Aspects of the present invention seek to provide a system and method for the analysis of data in real-time. In particular they may use a flexible querying language and data storage to allow users to register their interest in specific types of data, e.g. processes. The users can then be notified of matching results using an event-based mechanism.

In order to efficiently analyse a large amount of data, systems and methods of aspects of the present invention use a grid infrastructure that allows data to be stored across many grid nodes and the query execution workload to be distributed as well, thereby potentially avoiding the bottleneck represented by constantly querying a database.

Preferably these objectives are achieved by methods and systems which provide a continuous querying mechanism that analyses real-time data streams to generate relevant results. These methods and system may leverages data grid and event processing technology to provide a high performance and extremely scalable continuous querying solution.

Accordingly, at its broadest, a first aspect of the present invention provides a method of processing a continuous query on a stored data set which, when new data is added to the data set or the data set is modified, checks whether that data will impact on the continuous query and if so, processes the query.

A first aspect of the present invention preferably provides a method of processing a continuous query on a stored data set, the method including the steps of: receiving a query designated as a continuous query and storing a query model representing that query containing one or more atoms which are individual queries on the data set; when new data is added to the data set, or the data set is modified, checking the new or modified data against the atoms of the stored query model to determine if any part of the new or modified data matches an atom of the stored query model; if a match is found, checking whether the new or modified data matches the stored query model as a whole; if a match is found with the model as a whole, assigning any fixed values in the new or modified data that correspond to free variables in the query model to those free variables; processing the query resulting from said assignment on the stored data set; and returning the result of the query.

Typically the queries are specified in SPARQL. Although current SPARQL execution engines provide limited support for sophisticated continuous querying, the method of the present aspect is preferably able to execute normal SPARQL queries over real-time data with no modifications.

Compared to, for example, the known Atlas product, in which queries are defined using RDQL, a query language that has limited expressiveness, SPARQL has all the features of RDQL and more. It allows adding optional information to query results, defining disjunction of graph patterns and a wider range of expressions (date-time support, for example).

The method of this aspect preferably uses an event-driven approach to continuous queries. However the ultimate binding and execution of the query preferably allows for a very scalable solution.

The continuous query matching, binding and execution framework of this aspect leverages the flexibility in the data model to retrieve and analyze the data and uses a "push" notifications model to send updates to the user or other output.

The "push" notification approach offers considerable benefits compared to known "pull" notifications. Imagine a query is submitted to be continuously executed every hour: in case new data matching the query is submitted to the system after one hour and a half the query has been registered, this result will not be returned for the next half hour, until the query is executed again. In the push approach of the present aspect, the arrival of new data can "wake up" the queries that are registered in the system and in case the new data generates novel results these can be immediately returned to the client.

Moreover a stored query can be executed only when necessary and there is minimal or no delay between data entering the system and the creation of the results for the continuous queries.

The outputs from the stored continuous queries can be used to feed data into an event processor and the event processor can then applying further processing such as enriching data with timestamps in order to maintain statistics and other metrics about the data.

Preferably a continuous query is defined by the addition of an additional keyword (e.g. CONTINUOUS) in from of the SELECT statement in the query in order for the query to be recognised as a continuous query and be registered. In that case, a continuous query may be submitted to the system at time t, with the effect that the system returns the results set r matching the query that are already stored in the data set. If, at time t+1, a new set of information matching the query is introduced into the data set, the query registered returns the new results r1, r2. The union of r, r1 and r2 is equal to the result set returned by the same SPARQL query (without the CONTINOUS keyword) submitted at time t+1.

The processing of the present aspect generally does not require translation of the ontological data set, and also does not require the provision of timestamps.

Preferably the steps of checking, assigning, processing and returning are executed immediately on receipt of new data in the data set or modification of the data set. This enables the results of the query resulting from the addition or modification of data to/in the data set to be provided in real time, or substantially in real time.

Preferably the data set is stored on a plurality of interconnected nodes and the processing of the query is performed by assigning the query to one of said nodes for execution by that node. This ensures that the continuous query service, that is monitoring incoming events, does not get overloaded and can deal with events in real time.

In particular, this allows the execution of the query to be performed by the nodes, rather than by, for example, the event-processing node which hosts the continuous query service and the other central functions associated with the data grid, thereby freeing up that node to continue listening for and processing new data and/or processing queries (both new and other stored continuous queries).

In particular embodiments, the node to which the query is assigned is selected at random (this term is used to include pseudo-random allocation processes as are commonly known in computing fields). This means that the execution of the queries is generally equally distributed across the nodes of the grid.

Preferably the execution of the query by the node is performed asynchronously. As a result, the thread of the event/query-processing node does not have to wait for the results of the query execution and can be immediately released. This makes the method inherently scalable.

The addition or modification of data to/in the data set can take a number of forms. For example, new data may be added to the data set by bulk import. Alternatively or additionally, the method may further include the steps of: monitoring one or more processes; extracting data from those processes for storage in the data set; and storing said extracted data in the data set.

In a particularly preferred implementations, the processes are business processes and the data is business process data.

The method of the present aspect can be implemented on existing business process architecture and this can be done with minimum disruption as the method of this aspect relies on standard messaging and web services data interface techniques which are widely adopted.

The received query may further contain a designation of an observer, which is an object to which the results of the query are to be reported. In this arrangement, the step of returning the result preferably includes sending the result of the query to the observer.

The received query may further contain a time duration for the query, and the method can then further include the step of, when the time duration has expired, stopping processing the stored query model, for example by deleting the stored query model. This allows queries to "expire" after they have been stored for a particular length of time.

In certain configurations, a default time duration may be added to a query in which no time duration is specified to ensure that old queries do not clog up the processing of newer, more relevant queries.

A user who has submitted a query may be notified of the imminent expiry of a stored query and invited to renew that query if it is still considered relevant or useful.

The stored query model may have a plurality of query paths. If this is the case, the steps of matching may determine whether any of those paths do not match the new or modified data, and if any paths do not match, those paths are not executed in the step of processing. This allows the amount of time and processing capacity required to execute the query to be reduced to that which is necessary on the basis of the new or modified data.

Embodiments of this first aspect may include some, all or none of the above described optional or preferred features.

The method of this first aspect uses an approach that is completely data-driven and does not rely on pre-defined models for information extraction.

The preferred use of a semantic data model and data grid technology can provide considerable flexibility and a model that is scalable with regards to data collection and analysis.

Data can be captured as semantically defined triples with no bounds imposed on what can be stored in this format. This allows very powerful analysis and information extraction paradigms to be implemented, leveraging data grid technology and multiple compute and storage nodes.

The use of distributed data storage technology can also reduce latency and improve performance considerably.

Tests have shown that embodiments of the method of this first aspect can offer significant speedups for query execution, greatly enhancing the promise of semantic web technology.

At its broadest, a second aspect of the present invention provides a system which stores a continuous query relating to a stored data set which, when new data is added to the data set or the data set is modified, checks whether that data will impact on the continuous query and if so, processes the query.

Accordingly a second aspect of the present invention preferably provides a system for processing queries on a data set, the system including: one or more nodes storing part of the data in the data set and capable of executing queries on the data of the data set; a query engine which stores a query model representing a continuous query and containing one or more atoms which are individual queries on the data set, wherein, when new data is added to the data set, or the data set is modified: the node to which the data is added, or on which the data is modified sends the new or modified data to the query engine; the query engine: checks the new or modified data against the atoms of the stored query model to determine if any part of the new or modified data matches an atom of the stored query model; if a match is found, checks whether the new or modified data matches the stored query model as a whole; if a match is found with the model as a whole, assigns any fixed values in the new or modified data that correspond to free variables in the query model to those free variables; processes the query resulting from said assignment on the stored data set; and returns the result of the query.

Typically the queries are specified in SPARQL. Although current SPARQL execution engines provide limited support for sophisticated continuous querying, the method of the present aspect is preferably able to execute normal SPARQL queries over real-time data with no modifications.

The system of this aspect preferably uses an event-driven approach to continuous queries. However the ultimate binding and execution of the query preferably allows for a very scalable solution.

The continuous query matching, binding and execution framework of this aspect leverages the flexibility in the data model to retrieve and analyze the data and uses a "push" notifications model to send updates to the user or other output.

The "push" notification approach offers considerable benefits compared to known "pull" notifications. Imagine a query is submitted to be continuously executed every hour: in case new data matching the query is submitted to the system after one hour and a half the query has been registered, this result will not be returned for the next half hour, until the query is executed again. In the push approach of the present aspect, the arrival of new data can "wake up" the queries that are registered in the system and in case the new data generates novel results these can be immediately returned to the client.

Moreover a stored query can be executed only when necessary and there is minimal or no delay between data entering the system and the creation of the results for the continuous queries.

The outputs from the stored continuous queries can be used to feed data into an event processor and the event processor can then applying further processing such as enriching data with timestamps in order to maintain statistics and other metrics about the data.

Preferably a continuous query is defined by the addition of an additional keyword (e.g. CONTINUOUS) in from of the SELECT statement in the query in order for the query to be recognised as a continuous query and be registered. In that case, a continuous query may be submitted to the system at time t, with the effect that the system returns the results set r matching the query that are already stored in the data set. If, at time t+1, a new set of information matching the query is introduced into the data set, the query registered returns the new results r1, r2. The union of r, r1 and r2 is equal to the result set returned by the same SPARQL query (without the CONTINOUS keyword) submitted at time t+1.

The processing of the present aspect generally does not require translation of the ontological data set, and also does not require the provision of timestamps.

Preferably the operation of the query engine is activated immediately on receipt of new data in the data set or modification of the data set. This enables the results of the query resulting from the addition or modification of data to/in the data set to be provided in real time, or substantially in real time.

Preferably the query engine processes the query resulting from the assignment by assigning the query to one of said nodes for execution by that node. This ensures that the continuous query service, that is monitoring incoming events, does not get overloaded and can deal with events in real time.

In particular, this allows the execution of the query to be performed by the nodes, rather than by, for example, the event-processing node which hosts the continuous query service and the other central functions associated with the data grid, thereby freeing up that node to continue listening for and processing new data and/or processing queries (both new and other stored continuous queries).

In particular embodiments, the node to which the query is assigned is selected at random (this term is used to include pseudo-random allocation processes as are commonly known in computing fields). This means that the execution of the queries is generally equally distributed across the nodes of the grid.

Preferably the execution of the query by the node is performed asynchronously. As a result, the thread of the event/query-processing node does not have to wait for the results of the query execution and can be immediately released. This makes the method inherently scalable.

The addition or modification of data to/in the data set can take a number of forms. For example, new data may be added to the data set by bulk import. The system may further include a data importer for adding new data to said data set by storing it in said nodes.

Alternatively or additionally, the method may further include the steps of: monitoring one or more processes; extracting data from those processes for storage in the data set; and storing said extracted data in the data set. The system may further include a process monitor which monitors one or more processes and extracts data from said processes and stores it in said nodes.

In a particularly preferred implementation, the processes are business processes and the data is business process data.

The system of the present aspect can be implemented as part of existing business process architecture and this can be done with minimum disruption as the system of this aspect relies on standard messaging and web services data interface techniques which are widely adopted.

The received query may further contain a designation of an observer, which is an object to which the results of the query are to be reported. In this arrangement, the step of returning the result preferably includes sending the result of the query to the observer.

The received query may further contain a time duration for the query, and the query engine can then, when the time duration has expired, stopping processing the stored query model, for example by deleting the stored query model. This allows queries to "expire" after they have been stored for a particular length of time.

In certain configurations, a default time duration may be added to a query in which no time duration is specified to ensure that old queries do not clog up the processing of newer, more relevant queries.

A user who has submitted a query may be notified of the imminent expiry of a stored query and invited to renew that query if it is still considered relevant or useful.

The stored query model may have a plurality of query paths. If this is the case, the steps of matching may determine whether any of those paths do not match the new or modified data, and if any paths do not match, those paths are not executed in the step of processing. This allows the amount of time and processing capacity required to execute the query to be reduced to that which is necessary on the basis of the new or modified data.

Embodiments of this second aspect may include some, all or none of the above described optional or preferred features.

Embodiments of this second aspect preferably operate by carrying out a method according to the above first aspect, which may include some, all or none of the above described optional or preferred features of that aspect.

The continuous querying system described in the embodiments below leverages the functionality of a SPARQL[1] query engine to execute queries across a grid containing a plurality of data storage nodes. Details of the implementation of the grid-enabled query engine are known to the skilled person. An example is the Atlas system mentioned earlier. However, Atlas suffers performance issues when storing and processing more than a million triples. Moreover data is replicated: for each triple that is inserted in Atlas this is stored in multiple nodes. A preferred implementation of the grid-enabled query engine is set out in the co-pending U.S. patent application Ser. No. 13/435,747, also filed on Mar. 30, 2012, and entitled "METHOD AND SYSTEM FOR PROCESSING DATA QUERIES", the entire disclosure of which has been incorporated herein by reference in its entirety.

Although the system and method described below is envisaged as forming part of a real-time BPM system, this is just one example of its use. Since the data and the queries are defined based on W3C standards, the system and method can be used in any domain where the data and queries are compliant with these standards. The system is hence a very useful, general-purpose tool for real-time data analysis.

The methods and systems of the present invention are embodied in a system for business process mining using semantic web technology, ontologies, data grids and messaging systems. Such systems enable enterprises to deploy process monitoring software across their organisation and collect and analyse real-time data (e.g. via messaging systems) into a central data grid system. Leveraging the richness of semantically described data, users are able to perform complex analysis on the data set. The system supports real-time updates of data which means that any user queries will return the most recent results at any point in time. Moreover, in case new data is available that satisfies a request from a client, the client is automatically notified.

Continuous Querying for Real-Time Analysis

To understand business process data and extract relevant information from it, users typically define queries in the SPARQL language [1]. The SPARQL language is a standard query language which is based on graph pattern matching. To explain the operation of the systems and methods according to embodiments of the present invention and how they can allow users to extract different kinds of information from the data, we will consider several examples of SPARQL queries, for example:

```
PREFIX rdf: <http://www.w3.org/1999/02/22-rdf-syntax-ns#>
PREFIX ebtic: <http://org.ebtic.bpm.zeus/processOntology#>
PREFIX etisalat: <http://org.ebtic.bpm.demo#>
SELECT ?processID ?startTime ?endTime ?taskID ?taskType
?taskStartTime ?taskEndTime ?followingTaskID ?preceedingTaskID
WHERE {
    ?processID ebtic:processStartTime ?startTime.
    ?processID ebtic:processEndTime ?endTime.
    ?processID ebtic:hasTask ?taskID.
    ?taskID rdf:type ?taskType.
    ?taskID ebtic:startTime ?taskStartTime.
    ?taskID ebtic:endTime ?taskEndTime.
    OPTIONAL {?taskID ebtic:followedBy ?followingTaskID.}.
    OPTIONAL {?taskID ebtic:precededBy ?preceedingTaskID}.
FILTER (?processID = etisalat:DemoProcess-8164166017366845606)}
```

The query above requests the system to return a result set containing nine variables. Each of these variables is part of one or more query atoms, i.e. descriptions of certain constraints on the data that should be satisfied. The query also contains optional atoms that describe constraints that do not necessarily have to be satisfied.

The query contains filters: constraints on solutions over the whole group in which the filter appears. It essentially limits the query results to a subset that matches the filter conditions. These conditions are typically expressed for certain query variables. Variables that are not part of a filter definition can return an unrestricted set of values.

The query, as described above, is the primary method of extracting useful information from the data model of this embodiment. The main objective of the embodiments of the present invention is to provide an ability to perform real-time analysis of incoming data using SPARLQL queries.

As part of this system, we have developed a continuous query execution system, built on top of a SPARQL engine. Continuous querying involves matching incoming data (triples in our case) with all queries that have been registered with the system as continuous queries (see novel feature 1 in section 3). In the following sections, we will describe an architecture for executing these queries over real-time data according to embodiments of the present invention.

Continuous Queries

Continuous queries can be specified by adding the CONTINUOUS keyword to the SELECT statement in the normal query.

```
PREFIX rdf: <http://www.w3.org/1999/02/22-rdf-syntax-ns#>
PREFIX ebtic: <http://org.ebtic.bpm.zeus/processOntology#>
PREFIX etisalat: <http://org.ebtic.bpm.demo#>
CONTINUOUS SELECT
?processID ?startTime ?endTime ?taskID ?taskType
WHERE {
    ?processID ebtic:processStartTime ?startTime.
    ?processID ebtic:processEndTime ?endTime.
    ?processID ebtic:hasTask ?taskID.
    ?taskID rdf:type ?taskType.}
```

Once a query is parsed, the corresponding query model is generated. The system can choose to, at first, execute the query model as a normal query returning the results set, already in the repository, which satisfies the query. At the same time, if the CONTINUOUS keyword is specified, the query model is also registered as a continuous query.

Figure 1:
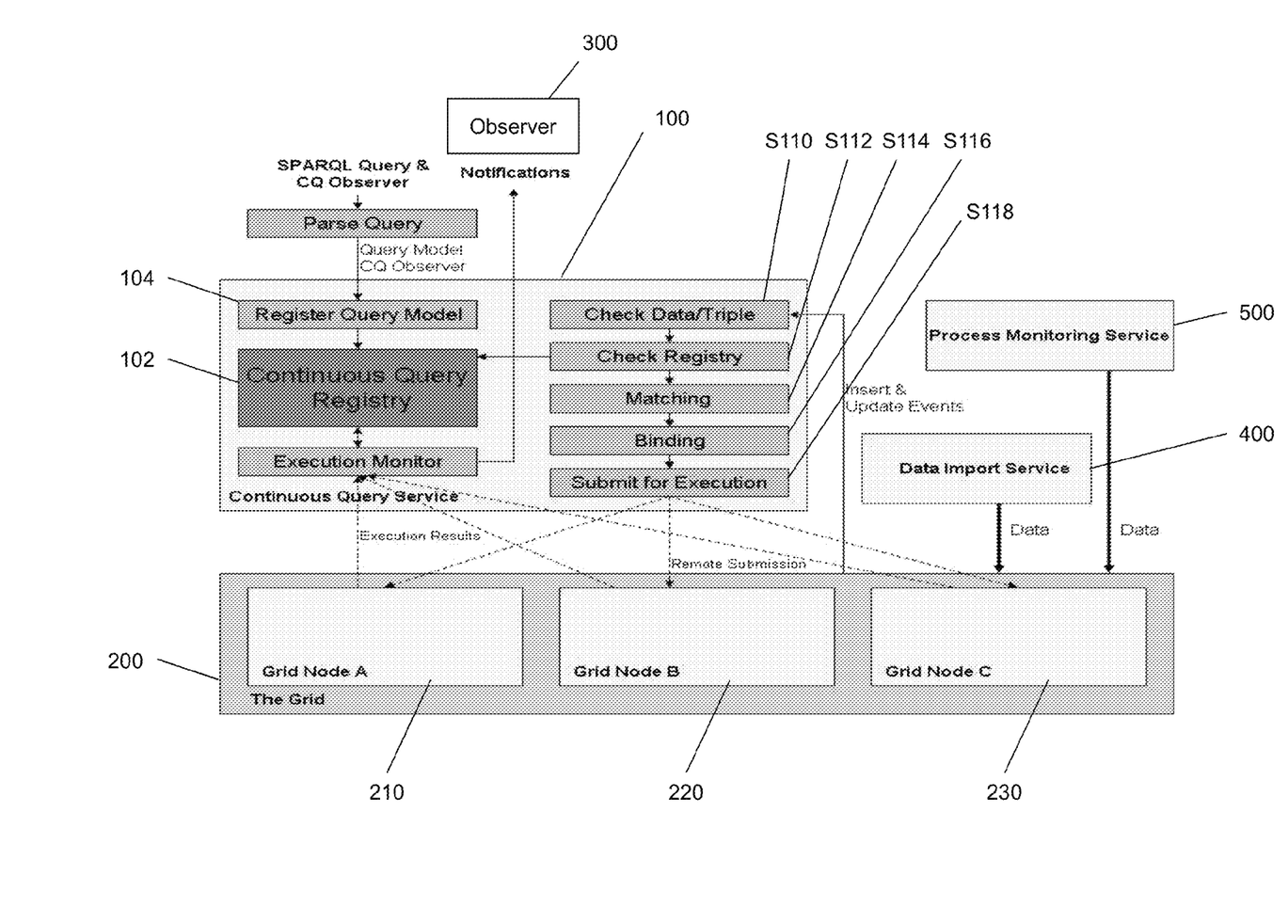
FIG. 1 shows a query processing system according to an embodiment of the present invention.

FIG. 1 summarizes the overall continuous query functionality.

The Continuous Query Service 100 can be seen as a service operating on a Grid 200 having a plurality of Grid Nodes 210, 220, 230.

The Continuous Query Registry 102 is invoked every time an insert or update event occurs on the triple store. The invocation mechanism used in our system is able to ignore the triples that are not going to generate any result. In order to do this, every time a query model is registered 104, the atoms comprising the model are analysed and the corresponding set of matching triple patterns is created. Therefore, whenever new triples are inserted into the grid, only the triples matching these patterns result in an invocation on the continuous query registry.

In the case where a triple matches one or more of the patterns defined in the Continuous Query Registry 102, the triple invokes a matching and binding process that generates new query models by binding variables and atoms to values in the incoming triple. The generated query models are then executed across the grid 200 and any results are notified to the observer 300: every time a continuous query is registered with the system, the registry requires that one or more event observers 300 are specified. When new results are generated, method stubs for issuing notifications are invoked on each of those observers.

An observer 300 is an arbitrary process that consumes the results of the query. For example, an observer can display the results on a screen, serialize and send the results over HTTP to a client, process them with Complex Events Processor etc.

We describe the system in detail below.

Receiving Data, Matching and Variable Binding

Let's assume, for example, that the query in the previous section is registered for continuous updates. The query is parsed and the resulting query model constructs are registered with the Continuous Query Registry 102 in the continuous query service 100.

Let us consider that the system receives, from either the data import service 400 (which is typically used to load bulk data) or the process monitoring service 500 (which sends real-time messages), for example, the following new triple:

```
<ebtic:BillingProcess2928726,ebtic:processStartTime,"2010-03-
01T02:15:13.074+04:00">
```

Every data insert into the grid generates an event which triggers the continuous query service 100.

The continuous query service is invoked by a listener on the data grid: whenever new data (a new triple) is inserted in the system the process starts. However by definition the RDF Graph does not contain duplicate data entries/triples, so the continuous query has to be executed only on new ones.

The continuous query service begins first by checking (S110) the validity of the new data point (see the Check Data/Triple module) by analysing if the triple inserted is a new data point in the system or if it is a triple that exists already, in this second case the triple is not relevant (since we assume was already in the graph) and therefore is skipped.

The continuous query service then checks (S112) the registry 102 to see if the data point matches a clause/atom of any of the registered SPARQL queries.

The matching algorithm (S114) iterates through the query atoms and checks whether the incoming data is a match, taking into account the fixed values, the "free" variables and filters defined on the atom.

In our example, the triple above matches the atom
?processID ebtic:processStartTime ?startTime
as the predicate values are the same and the subject and object are free variables.

In the binding phase (S116), the free variables are assigned the corresponding values in the triple. For example, the variable ?processID is assigned the value ebtic:Billing-Process2928726 and the variable ?startTime is assigned the value "2010-03-01T02:15:13.074+04:00".

The resulting query model of this example can be represented by the following SPARQL query:

```
PREFIX rdf: <http://www.w3.org/1999/02/22-rdf-syntax-ns#>
PREFIX ebtic: <http://org.ebtic.bpm.zeus/processOntology#>
PREFIX etisalat: <http://org.ebtic.bpm.demo#>
SELECT
    ?processID ?startTime ?endTime ?taskID ?taskType
WHERE {
    ?processID ebtic:processStartTime ?startTime.
    ?processID ebtic:processEndTime ?endTime.
    ?processID ebtic:hasTask ?taskID.
    ?taskID rdf:type ?taskType.
    FILTER ((?processID = ebtic:BillingProcess2928726) &&
    (?startTime = "2010-03-01T02:15:13.074+04:00")) }
```

In our example, there is only one match between the query atoms and the triple. If more matches are found, each match will result in a query model with a set of filters (one for each matching atom) connected through the OR connective.

As an example let us imagine the following query submitted to our system:

```
PREFIX rdf: <http://www.w3.org/1999/02/22-rdf-syntax-ns#>
PREFIX ebtic: <http://org.ebtic.bpm.zeus/processOntology#>
PREFIX etisalat: <http://org.ebtic.bpm.zeus.demo#>
CONTINUOUS SELECT ?processID ?taskID ?followingTaskID
?preceedingTaskID ?attribute
WHERE { ?processID ebtic:hasTask ?taskID.
```

-continued

```
    ?processID rdf:type ebtic:Process.
    ?taskID rdf:type ?task.
OPTIONAL {?taskID ebtic:followedBy ?followingTaskID.
    ?followingTaskID rdf:type ?followingTask.}.
OPTIONAL {?taskID ebtic:precededBy ?preceedingTaskID.
    ?preceedingTaskID rdf:type ?preceedingTask.}.}
```

For example, consider the case where the triple
<ebtic:BillingProcess2928726, rdf:type, ebtic:TaskA>
is inserted into the data store. We have multiple query atoms in the registered query model that match the new triple:

```
1. ?taskID rdf:type ?task
2. ?followingTaskID rdf:type ?followingTask.
3. ?preceedingTaskID rdf:type ?preceedingTask
```

The binding algorithm (S116) will generate an additional query model for each match. In case the matching atom is optional, the optional flag is reset to false, because the matching atom is guaranteed to return a result when executed. The query model can be merged using the "or" construct on the filters, as described below.

The following query model is generated.

```
PREFIX rdf: <http://www.w3.org/1999/02/22-rdf-syntax-ns#>
PREFIX ebtic: <http://org.ebtic.bpm.zeus/processOntology#>
PREFIX etisalat: <http://org.ebtic.bpm.zeus.demo#>
SELECT ?processID ?taskID ?followingTaskID ?preceedingTaskID
?attribute
WHERE { ?processID ebtic:hasTask ?taskID.
    ?processID rdf:type ebtic:Process.
    ?taskID rdf:type ?task.
OPTIONAL {?taskID ebtic:followedBy ?followingTaskID.
    ?followingTaskID rdf:type ?followingTask.}.
OPTIONAL {?taskID ebtic:precededBy ?preceedingTaskID.
    ?preceedingTaskID rdf:type ?preceedingTask.}.
FILTER( ((?taskID = ebtic:BillingProcess2928726) && (?task =
ebtic:TaskA)) ||
        ((?followingTaskID = ebtic:BillingProcess2928726) &&
(?followingTask = ebtic:TaskA)) || ((?preceedingTaskID =
ebtic:BillingProcess2928726) && (?preceedingTask = ebtic:TaskA)))
}
```

Note that the final query defines three filters, one of each of the matching atoms above. The filters are part of the "or" construct, where the query execution will return a result if any of the filters are matched. If no match is found, no further action is taken.

In the algorithm defined in the system of the present embodiment, binding the query with the atoms is essentially reduced to adding a set of filters representing the various possible variable bindings to the query model.

Once the variable binding process is over, the resulting query model is processed by the query engine.

In case of the existence of more than one query path in the model, in order to reduce the number of queries created by the binding step, our algorithm removes from the query model the paths that do not have any atom that has been bound with an element of the new triple.

Asynchronous Remote Execution

The query models generated in the step above are then sent across to different, randomly assigned grid nodes 210, 220, 230 etc. for execution (S118). This is an important feature as it frees up the data grid event-processing node, which hosts the continuous query service, to continue listening for and processing new data. The query execution job is submitted for asynchronous execution, i.e. the calling thread returns immediately.

This makes the system inherently scalable.

In most cases, the queries generated in the matching and binding phase above will be fairly small in terms of scope, the execution time required and expected result size because the number of free variables is reduced. The execution on the remote grid node is therefore self-contained, i.e. the execution if not distributed further across grid nodes.

The queries generated are typical SPARQL queries. Bindings are normally specified as filters.

The SPARQL queries execute on various nodes across the Data Grid 200. This gives each query access to the entire data set, if required. FIG. 1 shows how the query is executed across the Grid. The query model sent to the various nodes can either be the same query in the case of distributed execution, when many results are expected. Alternatively, they can be different query models representing different bindings. The latter approach is normally used for continuous query execution as the scope of the query is normally quite limited and only a handful of results are expected. Scalability is achieved mainly by executing many models in parallel.

Observers and Event Notifications

When a continuous query is registered with the system, an observer object 300 is also specified that will be notified of any new results from query execution when new data is received. The observer object 300 is typically a bespoke implementation provided by the client and can perform any number of functions, e.g. sending messages, updating graphs or statistics etc. Typical operation uses multi-threaded, non-blocking mode, i.e. the query result updates are simply added to a queue and the result notifier returns. Processing of the queue is offloaded to separate threads.

Lease Renewal and Timeouts

In most cases, continuous queries will be registered for a certain time duration after which they will expire and stop sending new updates. This can be specified using the timeout parameter.

However, if the client decides that it wants to receive events for longer, it can renew the query lease and specify a new timeout value. Specifying a timeout ensures that continuous queries will eventually be unregistered, even if the client or the network fails.

Summary

The system described in this embodiment enables the data mining of processes and information extraction in real-time. It allows real-time updates to the data using Continuous SPARQL Queries and push notifications, making query results more relevant. Users of the system are able to subscribe to and see the latest, most up-to-date state of the system at the time the query is issued.

The methods and systems described in the above embodiments are preferably combined and used in conjunction with each other.

The systems and methods of the above embodiments are typically implemented in a computer system (in particular in computer hardware or in computer software) in addition to the structural components and user interactions described.

The term "computer system" includes the hardware, software and data storage devices for embodying a system or carrying out a method according to the above described embodiments. For example, a computer system may comprise a central processing unit (CPU), input means, output means and data storage. Preferably the computer system has a monitor to provide a visual output display (for example in the design of the business process). The data storage may comprise RAM, disk drives or other computer readable media. The computer system may include a plurality of computing devices connected by a network and able to communicate with each other over that network.

The methods of the above embodiments may be provided as computer programs or as computer program products or computer readable media carrying a computer program which is arranged, when run on a computer, to perform the method(s) described above.

The term "computer readable media" includes, without limitation, any medium or media which can be read and accessed directly by a computer or computer system. The media can include, but are not limited to, magnetic storage media such as floppy discs, hard disc storage media and magnetic tape; optical storage media such as optical discs or CD-ROMs; electrical storage media such as memory, including RAM, ROM and flash memory; and hybrids and combinations of the above such as magnetic/optical storage media.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the spirit and scope of the invention.

In particular, although the methods of the above embodiments have been described as being implemented on the systems of the embodiments described, the methods and systems of the present invention need not be implemented in conjunction with each other, but can be implemented on alternative systems or using alternative methods respectively.

REFERENCES

[1]. Eric Prud'hommeaux, W3C Andy Seaborne SPARQL Query Language for RDF W3C Recommendation 15 Jan. 2008 http://www.w3.org/TR/rdf-sparql-query/

[2]. Davide Francesco Barbieri, Daniele Braga, Stefano Ceri, Emanuele Della Valle, and Michael Grossniklaus. C-SPARQL: SPARQL for continuous querying. In Proceedings of the 18th international conference on World wide web (WWW '09). ACM, New York, N.Y., USA, 1061-1062. DOI=10.1145/1526709.1526856 http://doi.acm.org/10.1145/1526709.1526856

[3]. Erietta Liarou, Stratos Idreos, and Manolis Koubarakis. Continuous RDF query processing over DHTs. In Proceedings of the 6th international semantic web conference and $2^{nd}$ Asian conference on semantic web (ISWC'07/ASWC'07. Springer-Verlag, Berlin, Heidelberg, 324-339.

[4]. Darko Anicic, Paul Fodor, Sebastian Rudolph, and Nenad Stojanovic. 2011. EPSPARQL: a unified language for event processing and stream reasoning. In Proceedings of the 20th international conference on World wide web (WWW '11). ACM, New York, N.Y., USA.

All references referred to above are hereby incorporated by reference.

The invention claimed is:

1. A method of processing a continuous query on a stored data set when pertinent data in the stored data set is added or modified, the method including the steps of:

receiving a query designated as a continuous query and storing a query model representing that query containing one or more atoms which are individual queries on the data set;

when new data is added to the data set, or the data set is modified, checking the new or modified data against the atoms of the stored query model to determine if any part of the new or modified data matches an atom of the stored query model;

if, when checking the new or modified data against the atoms of the stored query model, a match is found, checking whether the new or modified data matches the stored query model as a whole;

if, when checking whether the new or modified data matches the stored query model as a whole, a match is found with the model as a whole, assigning any fixed values in the new or modified data that correspond to free variables in the query model to those free variables;

in response to assigning any fixed values in the new or modified data that correspond to free variables in the query model to those free variables, processing the query resulting from said assignment on the stored data set; and in response to processing the query resulting from said assignment on the stored data set, returning the result of the query.

2. The method according to claim 1 wherein the data set is stored on a plurality of interconnected nodes and the processing of the query is performed by assigning the query to one of said nodes for execution by that node.

3. The method according to claim 2 wherein the node to which the query is assigned is selected at random.

4. The method according to claim 2 wherein the execution of the query by the node is performed asynchronously.

5. The method according to claim 1 wherein the method further includes the step of adding new data to the data set by bulk import.

6. The method according to claim 1 wherein the method further includes the steps of:
monitoring one or more processes;
extracting data from those processes for storage in the data set; and
storing said extracted data in the data set.

7. The method according to claim 6 wherein the processes are business processes and the data is business process data.

8. The method according to claim 1 wherein the received query further contains a designation of an observer, which is an object to which the results of the query are to be reported, and the step of returning the result sends the result of the query to the observer.

9. The method according to claim 1 wherein the received query further contains a time duration for the query, and the method further includes the step of, when the time duration has expired, stopping processing the stored query model.

10. The method according to claim 9 wherein step of stopping processing deletes the stored query model.

11. The method according to claim 1 wherein the queries are specified in SPARQL.

12. The method according to claim 1 wherein if the stored query model has a plurality of query paths, the steps of matching determine whether any of those paths do not match the new or modified data, and if any paths do not match, those paths are not executed in the step of processing.

13. The method according to claim 1 wherein the steps of checking, assigning, processing and returning are executed immediately on receipt of new data in the data set or modification of the data set.

14. The computer system for processing queries on a data set, the computer system including a processing unit having data storage and including:
one or more nodes storing part of the data in the data set and capable of executing queries on the data of the data set;
a query engine which stores a query model representing a continuous query and containing one or more atoms which are individual queries on the data set,
wherein, when new data is added to the data set, or the data set is modified:
the node to which the data is added, or on which the data is modified sends the new or modified data to the query engine;
the query engine:
checks the new or modified data against the atoms of the stored query model to determine if any part of the new or modified data matches an atom of the stored query model;
if, when checking the new or modified data against the atoms of the stored query model, a match is found, checks whether the new or modified data matches the stored query model as a whole;
if, when checking whether the new or modified data matches the stored query model as a whole, a match is found with the model as a whole, assigns any fixed values in the new or modified data that correspond to free variables in the query model to those free variables;
in response to assigning any fixed values in the new or modified data that correspond to free variables in the query model to those free variables, the computer system processes the query resulting from said assignment on the stored data set; and
in response to processing the query resulting from said assignment on the stored data set, returns the result of the query.

15. The system according to claim 14 wherein the query engine processes the query resulting from said assignment by assigning it to one of said nodes.

16. The system according to claim 15 wherein said assignment is random.

17. The system according to claim 14 wherein said assignment is asynchronous.

18. The system according to claim 14 further including a process monitor which monitors one or more processes and extracts data from said processes and stores it in said nodes.

19. The system according to claim 14 further including a data importer for adding new data to said data set by storing it in said nodes.

* * * * *